Feb. 11, 1930.  A. W. HILL  1,746,310
VEHICLE AWNING
Filed Jan. 14, 1928
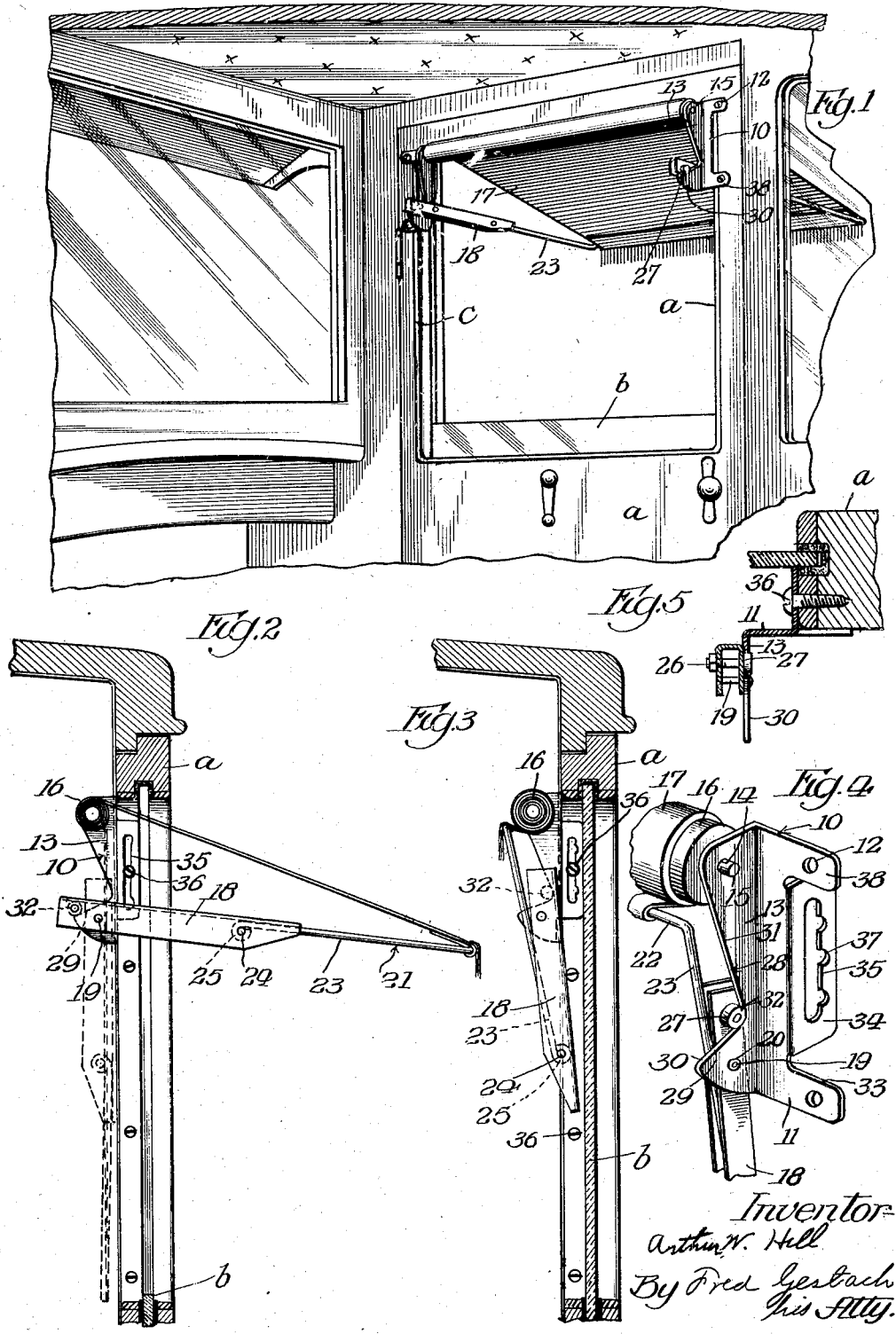

Patented Feb. 11, 1930

1,746,310

UNITED STATES PATENT OFFICE

ARTHUR W. HILL, OF BELMOND, IOWA

VEHICLE AWNING

Application filed January 14, 1928. Serial No. 246,673.

The invention relates generally to awnings or sun shades which are designed for use in connection with the doors or windows of sedans and other closed types of automobile bodies and more particularly to those awnings which embody a shade in the form of a roll, brackets therefor and a collapsible supporting frame which is pivotally connected to the brackets and is adapted to be extended and swung outwardly through the window frame to which the awning is connected to hold the shade in its operative position, the collapsible supporting frame being held in such position by the use of stop devices and the spring which is applied to rewind the shade.

One object of the present invention is to provide an awning of this character comprising brackets which are of a simplified form and are cut or slotted to form surfaces which are adapted to cooperate with stop pins on the arms to limit the outward movement of the frame and shade.

Another object of the invention is to provide awning brackets of this type which are especially adapted to be used on narrow steel framed windows and in which provision is made for securing the brackets in place on the frame by the bolts which are used to connect the frame to the window proper.

A further object of the invention is to provide an awning of the aforementioned character in which the pivots for the shade roll are disposed directly above and in substantially vertical alignment with the pivots for the supporting frame. As a result of this construction the supporting frame may be unfolded and shifted into a vertical position so that the shade may be used as a curtain, without the frame being subject to the action of the spring because of the dead center arrangement which exists.

A still further object of the invention is to provide an awning for use in connection with automobiles which is simple in its construction, consists of a minimum number of parts, and may be produced at a comparatively low cost.

Other objects of the invention and the various advantages and characteristics of the present construction will be apparent from a consideration of the following detailed description.

The invention consists in the several novel features hereinafter set forth and more particularly defined by the claims at the conclusion hereof.

In the drawing which accompanies and forms a part of this disclosure and in which like characters and numerals of reference denote corresponding parts throughout the several views:

Figure 1 is a fragmentary perspective view of an automobile body, the side door of which is equipped with an awning embodying the invention;

Figure 2 is a vertical section taken through the door and showing the awning in its extended or operative position;

Figure 3 is a view similar to Figure 2, showing the shade supporting frame in its folded position;

Figure 4 is a perspective view of one of the brackets for supporting the shade roll and frame and the parts associated therewith; and Figure 5 is a transverse sectional view taken through the central position of the bracket shown in Figure 4 and illustrating in detail the stop mechanism or arrangement.

The awning which forms the subject matter of the present invention is adapted for use in protecting the driver or occupants of an automobile from the intense heat or rays of the sun or from rain when it is desired to leave open the window to which the awning is applied. This awning is adapted to be secured to the interior of the automobile adjacent a window or a windowed door $a$ and is adapted to be shifted into its operative position when the glass pane $b$ is lowered either partially or completely. The awning comprises a pair of supporting brackets 10 which are formed from sheet metal. Each of these brackets embodies a flat rectangular plate 11 which is adapted to fit against one of the side bars $c$ of the door and is provided with holes 12 for the passage of screws or nails whereby the bracket may be secured in place. Each bracket also comprises a side flange 13 which extends at right angles to the attaching plate 11 and toward the interior of the automobile, i. e., inwardly with respect to the pane *b*. The plates 11 are arranged so that the flanges 13 are adjacent the marginal part of the glass pane, as illustrated in Figure 5. Sockets 14 are formed in the upper ends of these flanges to receive the terminal pins or trunnions 15 of a shade roller 16. The latter is spring actuated so as to wind the shade 17 thereon. This shade is flexible and is preferably formed of a waterproofed material so as to be impervious to rain and moisture. If a regular window shade is used the clutch or pawl and ratchet mechanism which is usually employed for holding the shade in an assigned position is eliminated or dispensed with and the pin (not shown) to which the spring is applied is locked in its socket 14 against rotation, as well understood in the art.

Pivotally secured to the lower ends of the flanges 13 is a frame for supporting the shade 17 in its extended position. This frame comprises a pair of arms 18 which are U-shaped in cross-section and are pivoted respectively at their upper ends to the lower ends of the flanges 13. The arms 18 are disposed adjacent the opposing faces of the flanges 13 so that they are free to swing outwardly through window frame *d* as indicated in Figure 2 of the drawing. The pivotal connections between the arms and the lower ends of the flanges 13 comprise studs 19 which extend through the flanges 13 and both legs of the arms. The outer ends of the studs 19 are riveted or beaded over as at 20 to hold the studs against displacement. The frame also comprises a U-shaped member 21 comprising a cross bar 22 and a pair of arms 23 which are pivoted at their upper or distal ends to the lower ends of the arms 18 by means of studs 24. The latter extend through both legs of the arms and are similar in construction to the studs 19. The upper ends of the arms 23 are disposed between the legs of the U-shaped arms so that they may fold therebetween when the frame is collapsed, as indicated in Figures 3 and 4. The studs 23 are positioned inwardly of the extreme ends of the arms 18 so that the latter will operate to hold the arms 23 against relative pivotal movement in one direction. In other words, the extremities of the arms 18 form abutments for limiting the outward movement of the arms past their dead center position. The outer ends of the arms 23 are bent into circular formation to form eyelets 25 through which the studs 24 extend. The outer or free end of the shade 17 is connected in any suitable manner to the cross bar 22. As a result when the U-shaped member 21 is swung outwardly so that the arms 23 and 18 form continuations of each other, the shade is extended and rendered operative.

In this position the frame may be arranged in a vertical position (dotted lines, Figure 2) to eliminate from the interior of the automobile as much light as possible or it may be swung outwardly through the window and into the position shown in Figure 2. The studs 19 are arranged directly below and in substantially vertical alignment with the trunnions 15. A characteristic of this construction is that the frame, when extending in its vertical position, is not deflected or displaced by the action of the roller-spring, because of the dead-center relation that exists. In other words, the shade is in alignment with the frame and the pivots therefor so that the spring for the roller has no effect or tendency to shift the frame one way or the other. In actual practice, the friction between the various parts operates to hold the latter rigid when they are in the position referred to. When the shade is in its vertical position the pane *b* may be raised to its completely closed position.

To prevent the frame from being swung upwardly beyond the position shown in Figure 2, stop mechanism is provided. This mechanism comprises a pair of bolts 26 which extend respectively through the extreme upper ends of the arms 18. The heads 27 of these bolts are cylindrical and are disposed adjacent the outer faces of the arms 18 so that they are in alignment with the flanges 13. The central portions of the latter are notched or cut away to form recesses or slots 28 for accommodating the heads of the bolts 26 and in which the latter are free to move. The edges 29 which form the lower portions of the recesses are substantially straight and the outer ends thereof form abutments 30 against which the heads 27 strike to limit the outward movement of the frame (see Figure 2). The edges 31 which adjoin the edges 29 form at their lower ends abutments 32. The latter limit the inward movement of the frame and operate to hold the arms 18 in a substantially vertical position when the frame is in its folded or inoperative position (see Figures 3 and 4). A characteristic of the specific stop mechanism shown is that it is positive in its action and embodies no adjustable screws which might come loose and be lost.

In some instances it is desirable to attach the plates 11 to the window frame *d* instead of the side bars *c* of the door. For this reason, the plates 11 are sheared as at 33 to form flanges 34 which are bent to project outwardly and lap the side members of the frame *d*. Each of the flanges 34 is provided with a vertical slot 35 through which may pass the usual attaching screw 36 for the frame *d*. By having vertical slots in the flanges 34 the brackets may be adjusted vertically into the desired position. A plurality of semi-circular pockets 37 are formed at the sides of slots 35 into which the screws 36 may be fitted so that the brackets are locked against vertical displacement. The portions of the plates 11 adjacent the cuts 33 form ears 38 which lap the side bars c and prevent the brackets from rocking sidewise.

The operation will be as follows: When it is desired to use the awning, the operator will grasp the free end of the curtain which is doubled back over the cross bar 22 and swing the latter inwardly and downwardly. This causes the arms 23 to be swung away from the arms 18 and into their extended position. The frame is then pushed outwardly through the window until arrested by the heads 27 striking against the abutments 30, it being understood of course that the glass b is first lowered. In this position the shade 17 extends at an angle with respect to the frame and the tension which is applied thereto operates to hold the various parts rigid. By swinging the frame into a vertical position, a maximum amount of light may be excluded. In this position, as previously pointed out, the tension of the spring does not effect the frame and friction holds the latter in place against displacement. To close the awning it is only necessary to grasp the free end of the shade and swing it inwardly. As soon as the shade passes out of alignment with the frame, the action of the spring operates to collapse the arms 18 and 23 and to swing them upwardly until arrested by the heads of the stop bolts striking against the abutments 32.

In applying the awning to the door of an automobile the screws 36 in the upper ends of the frame side members are withdrawn. The brackets are then clamped in place by passing the screws through the slots and screwing them into their original position. Before tightening these screws the brackets may be adjusted as desired and so that the screws are partially contained in the pockets 37. Instead of securing the brackets in this manner, screws may be inserted through the holes 12 to connect the brackets directly to the side bars c of the door.

The awning herein described is extremely simple in construction, embodies brackets and stop mechanism of an improved character, and may be manufactured readily and at a low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A mounting for the spring roller and shade of a vehicle awning, said mounting consisting of a bracket adapted to be secured adjacent the frame of a window in the vehicle and comprising an attaching plate and a flange extending at substantially right angles thereto and having a socket at its upper end for receiving one of the trunnions of the spring roller, a collapsible frame-member to one end of which the shade is attached, said frame-member being pivoted at its other end to the lower end of the flange and being adapted, when extended, to be swung outwardly and to sustain the shade in its operative position, the flange being cut away above the pivot to form an abutment edge, and a stop element carried by said other end of the frame-member and arranged to strike against the abutment edge to limit the outward movement of the frame-member when it is extended and to limit the inward movement of the frame-member when it is in its collapsed position.

2. A mounting for the spring roller and shade of a vehicle awning, said mounting consisting of a bracket adapted to be arranged adjacent to one of the windows of the vehicle and comprising a plate having an outwardly projecting flange at one side thereof and an inwardly projecting flange at the other side, the outwardly projecting flange being adapted to fit against one of the side members of the window frame and having a vertical slot therein for receiving an attaching screw, the inwardly projecting flange having a socket at one part thereof for receiving one of the trunnions or pivot pins of the roller, and a frame-member, to one end of which the shade is attached, said frame-member being pivoted at its other end to another part of the inwardly projecting flange and being adapted when swung outwardly with respect to the bracket to sustain the shade in its operative position.

3. A mounting for the spring roller and shade of a vehicle awning, said mounting consisting of a supporting bracket adapted to be secured adjacent to one of the windows of the vehicle and comprising a plate having an inwardly projecting flange at one side thereof, the other side of the plate being sheared and bent to form an outwardly projecting flange adapted to fit against one of the side members of the window frame and a pair of ears adapted to fit against the bars at the sides of the frame, the inwardly projecting flange having a scocket at one part thereof for receiving one of the trunnions or pivot pins of the spring roller, and a collapsible frame-member to one end of which the shade is attached, said frame-member being pivoted at its other end to another part of the inwardly projecting flange and being adapted when extended and swung outwardly with respect to the bracket to sustain the shade in its operative position.

4. In an awning for a vehicle, the combination of a pair of brackets adapted to be secured adjacent to the frame of a window for the vehicle, each of said brackets comprising an attaching plate, and a flange adapted to extend vertically when the plate is in its operative position and having a socket in its upper end, a spring roller extending between the brackets and having pins at its ends disposed in the sockets in the flanges, a shade wound around the roller, and a U-shaped frame consisting of a pair of jointed or articulated arms, and a crossbar connected to the outer ends of the arms and attached to the free end of the shade, said arms being connected at their inner ends to pivots on the lower ends of the flanges and being adapted, when extended or unfolded, to sustain the shade in its operative position, the pivots for said inner ends of the arms being disposed directly beneath the sockets and substantially in vertical alignment therewith so that when the arms of the frame are extended and swung downwardly into a vertical position the frame is not shifted out of such vertical position by the action of the spring for the roller.

5. A mounting for the spring roller and shade of a vehicle awning, said mounting consisting of a bracket embodying an attaching plate whereby it may be secured adjacent to the frame of a window in the vehicle, and a flange-member projecting inwardly and substantially at right angles to the plate and having a socket at one part thereof for receiving one of the trunnions or pivot pins of the spring roller, a frame-member having means at one end thereof for attachment to the free end of the shade, said frame-member being pivoted at its other end to another part of the flange-member and being adapted, when swung outwardly with respect to the attaching plate of the bracket, to sustain the shade in its operative position, and means for limiting the outward and inward movement of the frame-member comprising a stop element carried by one of the members and extending through a notched or cut away portion in the other member.

Signed at Belmond, Iowa, this 9th day of January, 1928.

ARTHUR W. HILL.